United States Patent [19]

Komura

[11] 4,058,674

[45] Nov. 15, 1977

[54] GRAPHIC INFORMATION COMPRESSION METHOD AND SYSTEM

[75] Inventor: Yasuyuki Komura, Tokyo, Japan

[73] Assignee: Kabushiki Kaisha Ricoh, Tokyo, Japan

[21] Appl. No.: 659,866

[22] Filed: Feb. 20, 1976

Related U.S. Application Data

[63] Continuation-in-part of Ser. No. 451,161, March 14, 1974, abandoned.

[30] Foreign Application Priority Data

Mar. 27, 1973   Japan .................................. 48-35413

[51] Int. Cl.² .............................................. H04N 1/40
[52] U.S. Cl. ................................................... 358/260
[58] Field of Search ...................... 178/DIG. 3, 6, 6.8; 358/260, 261

[56] References Cited

U.S. PATENT DOCUMENTS

| | | | |
|---|---|---|---|
| 3,588,329 | 6/1971 | Monk | 358/260 |
| 3,700,797 | 10/1972 | Wernikoff | 178/DIG. 3 |
| 3,784,737 | 1/1974 | Waehner | 178/DIG. 3 |
| 3,950,609 | 4/1976 | Tanaka | 178/DIG. 3 |

Primary Examiner—Howard W. Britton
Attorney, Agent, or Firm—Frank J. Jordan

[57] ABSTRACT

Graphic information is encoded in the form of an electrical pulse train, which is divided into a number of blocks of equal length. Only those blocks containing pulses are retained, and are combined for transmission with a decoding signal for subsequent synthesis of the original pulse train. The compression efficiency may be further increased by converting the pulse train into delta graphic form, or a modified delta graphic form in which extremely short pulses are suppressed prior to compression.

11 Claims, 10 Drawing Figures

GRAPHIC INFORMATION COMPRESSION METHOD AND SYSTEM

The present application is a continuation-in-part of copending application Ser. No. 451,161 filed Mar. 14, 1974, entitled "Graphic information compression method and system", now abandoned.

The present invention relates to a method and system for compression graphical information encoded in the form of an electrical pulse train for transmission, and furthermore to a system for transmitting and receiving graphical information utilizing the compression system including means at the receiving end for expanding the compressed information.

In a graphic information transmission system such as a facsimile system, a graphical document is scanned in a regular orthogonal pattern, and an electrical pulse train is produced in which a pulse represents a portion of the document which has a density greater than a certain value. In order to obtain satisfactory resolution, it is necessary to divide the document into thousands of tiny areas and provide an electrical indication of the density of each area. If all of these thousands of bits of information are actually transmitted, the transmission time is excessively long, and expensive equipment is required for transmission and reception. For this reason, it is desirable to compress the graphical information so that a smaller number of bits of information are required to define the document with a satisfactory degree of resolution. The prior art includes a compression system in which only the lines of a printed document are scanned, and the blank spaces between the lines are skipped. This system is relatively inefficient in that if a printed line contains only one characyer or word, the entire line will be transmitted with most of the transmitted information being useless. Also, it is obvious that this system is not usable with graphic information in other than a printed form.

The prior art also includes more efficient compression systems such as delta graphic conversion, in which information representing a scanned line is not transmitted as such, but is converted to a form representing the difference between the scanned line and the preceding line. Although this method represents a considerable improvement in compression efficiency, it is obvious in the art that it is possible to provide even more effective compression.

It is accordingly an important object of the present invention to provide a method of compressing graphic information encoded in the form of electrical pulses which is more efficient than prior art methods.

It is another important object of the present invention to provide a system embodying the above described method.

It is still another object of the present invention to provide a system embodying the above described method for transmitting and receiving graphic information including means for expanding the compressed information.

The above and other objects, features and advantages of the present invention will become more apparent from the following detailed description taken in conjunction with the accompanying drawings, in which.

Figure 1:
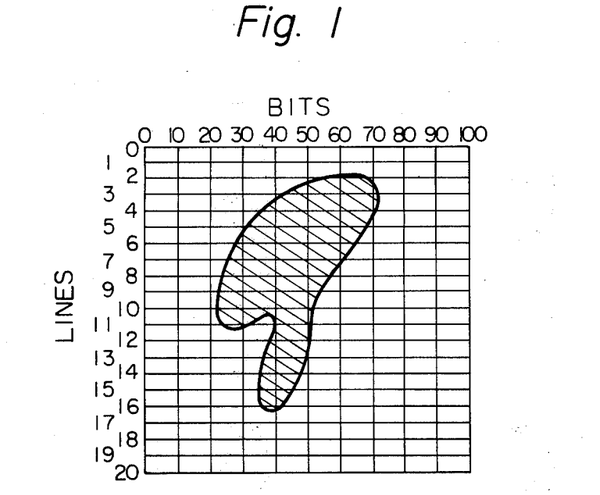
FIG. 1 is a diagrammatic view of a graphic document illustrating a conventional regular orthogonal scanning method associated with the invention.

Referring now to FIG. 1, there is shown a two dimensional graphic document containing graphic information in the form of an irregular dark area. It must be made clear that the invention relates to a method and system for compressing graphical information which has already been encoded in the form of an electrical pulse train, and also to a system for expanding the thus compressed information. It is therefore irrelevant as to how the pulse train was produced. Although the invention is specifically suited for use in a facsimile system in which a two dimensional graphic document is scanned, its scope also includes applications in which the two dimensional graphic document is intangible; for example, a two dimensional representation within a television camera of an optically scanned three dimensional object or scene.

FIG. 1 illustrates a commonly used, regular orthogonal scanning system, in which each line 1 to 20 is divided into 100 discrete bits. Scanning is from left to right, top to bottom, as common in the art. A pulse train produced by scanning the entire document will therefore contain 2000 discrete bits of information. If it is assumed that a positive pulse is produced for each area having a density greater than a certain value and that no pulse is produced if the density of an area is less than the certain value, scanning of the document of FIG. 1 will produce the electrical pulse train of FIG. 2, in which sequential lines are arranged vertically for ease of illustration. The invention proposes to subdivide each line into a predetermined number of blocks, here shown as being 10, which are numbered 0 to 9. The total number of blocks is thus the number of lines times the number of blocks per line, or 200, and the number of bits per block is the number of bits per line divided by the number of blocks per line, or 10.

Figure 2:
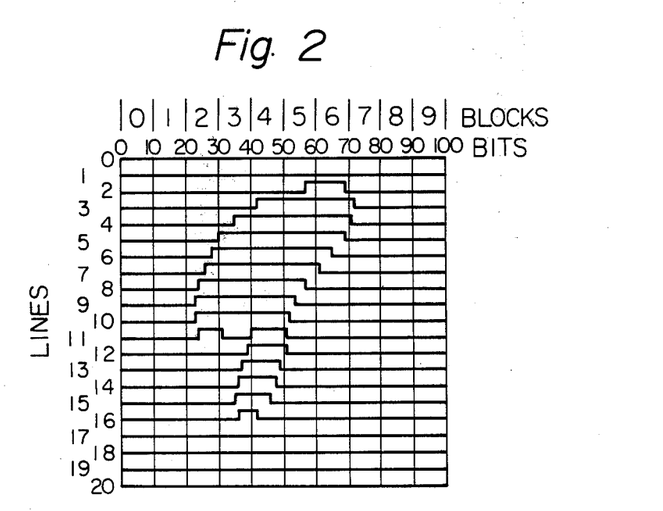
FIG. 2 is a diagrammatic view of electrical pulses produced by scanning the document of FIG. 1 further illustrating division of each scanning line into a number of blocks.

The basic concept of the invention is to provide superior graphic information compression efficiency by transmitting only the graphic information (bits) of blocks containing pulses, which in FIG. 2 correspond to dark areas of the graphic document. In addition, the concept of the invention may also be combined with known compression methods to even further increase the compression efficiency.

Figure 3:
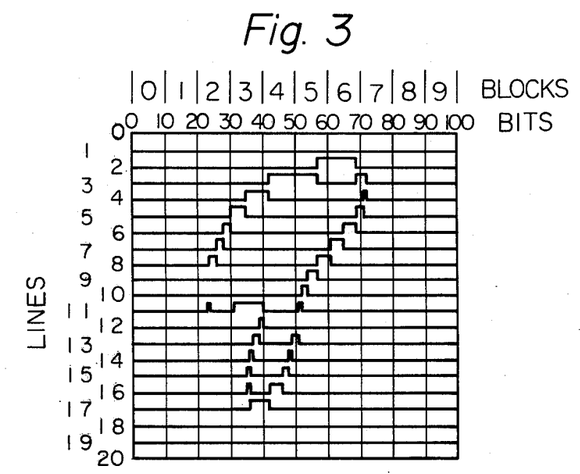
FIG. 3 is similar to FIG. 2, but shows the electrical pulses as converted into delta graphic form.
Figure 4:
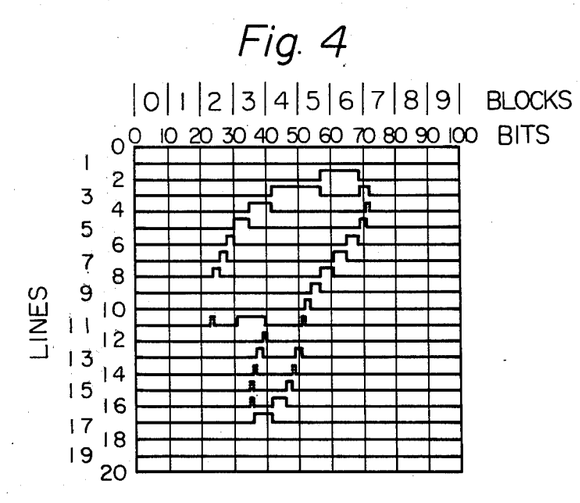
FIG. 4 is similar to FIG. 3, but illustrates how extremely short pulses may be supressed without excessive loss of resolution.

FIG. 3 shows the pulse train of FIG. 2 after conversion to delta graphic form. In this operation, the first line is reproduced without alteration, and the second line is then compared with the first line on a bit by bit basis. A logically negative or "delta while" signal shown in FIG. 3 as no pulse is provided when the corresponding bits of the two lines are the same, and a logically positive or "delta black" signal shown in FIG. 3 as a positive pulse is produced when the corresponding bits of the two lines are different. The delta graphic method thus defines the outline of an area of the document rather than defining the area directly. The process is repeated for successive lines in that a given line is compared with the preceding line (not the graphic delta representation of the preceding line) until all of the lines have been converted. The compression efficiency of this method arises from the strong correlation between adjacent lines of most graphical documents, so that the ratio of delta black information to delta white information is generally quite low. In many applications, the compression efficiency can be further increased by suppressing pulses having a length less than a certain value, such as delta black pulses comprising only one bit, as shown in broken line in FIG. 4. Although there is a slight loss of resolution produced by this method, herein referred to as "modified delta graphic," it is in many practical cases acceptable. Also, a delta block pulse whose leading or trailing edge spans only one bit of an adjacent block may be suppressed. The concept of the invention may be combined with either of these methods.

Figure 5:
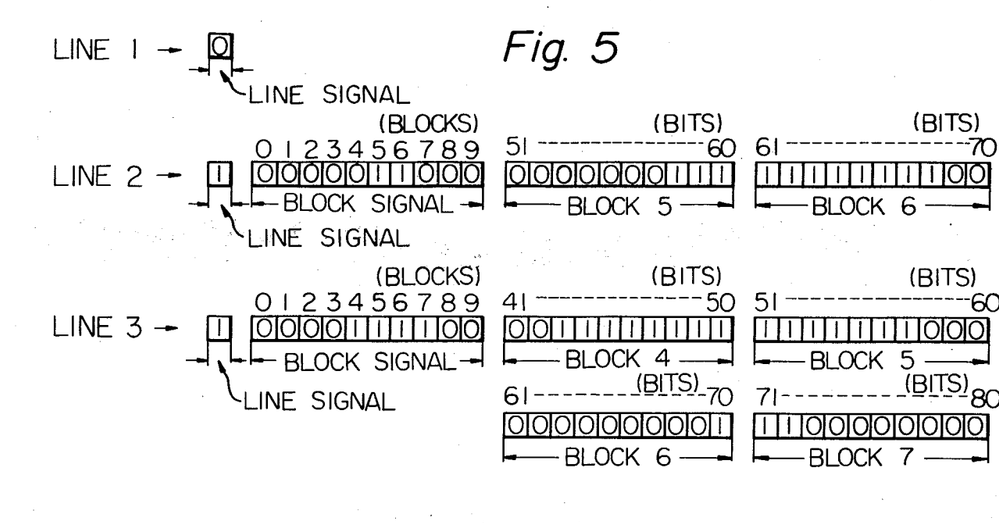
FIG. 5 is a tabular view of a portion of an electrical pulse train compressed according to a method of the invention.

FIG. 5 shows a portion of the pulse train of FIG. 3 as being in compressed form according to the invention, in which only those blocks containing delta black information are retained and are combined with line signals and block signals. A logically positive signal "1" represents a line or block which contains delta black information comprising at least one bit, and a logically negative signal "0" represents a line or block which is devoid of delta black information. If a given line (such as line 1 in the example) does not contain delta black information, only a negative line signal "0" will be provided. If at least one block of a given line contains at least one bit of delta black information, a positive line signal "1" will be produced. This will be followed by a block signal indicating which of the blocks contain delta information. Thereafter, the blocks of that line will be sequentially arranged with the blocks which do not contain delta black information omitted.

In the exemplary case of FIGS. 3 and 5, line 1 does not contain any delta black information, so only a negative "0" line signal is produced. In line 2, however, bits 58 to 60 of block 5 and bits 61 to 68 of block 6 are delta black. Therefore, a positive "1" line signal is produced followed by a block signal. Bits 0 to 9 of the block signal correspond to blocks 0 to 9 of the corresponding line, and bits 5 and 6 of the block signal for line 2 are therefore positive "1" indicating that blocks 5 and 6 contain delta black information. The block signal is followed by blocks 5 and 6 in that order.

Similarly, in line 3, blocks 4 to 7 contain delta black information, and therefore bits 4 to 7 of the block signal are positive "1" and the rest are negative "0".

The invention is also applicable to a case in which the pulse train is compressed as produced by the scanner without conversion to delta graphic form. The invention is also applicable to a case in which the pulse train is continuous rather than being divided into lines. In this case, the information is compressed in a predetermined arrangement in which a block signal is followed by the blocks containing pulses. If the pulse train is divided into lines, a second predetermined arrangement described above is in the general form line signal + block signal + blocks containing pulses.

Figure 6:
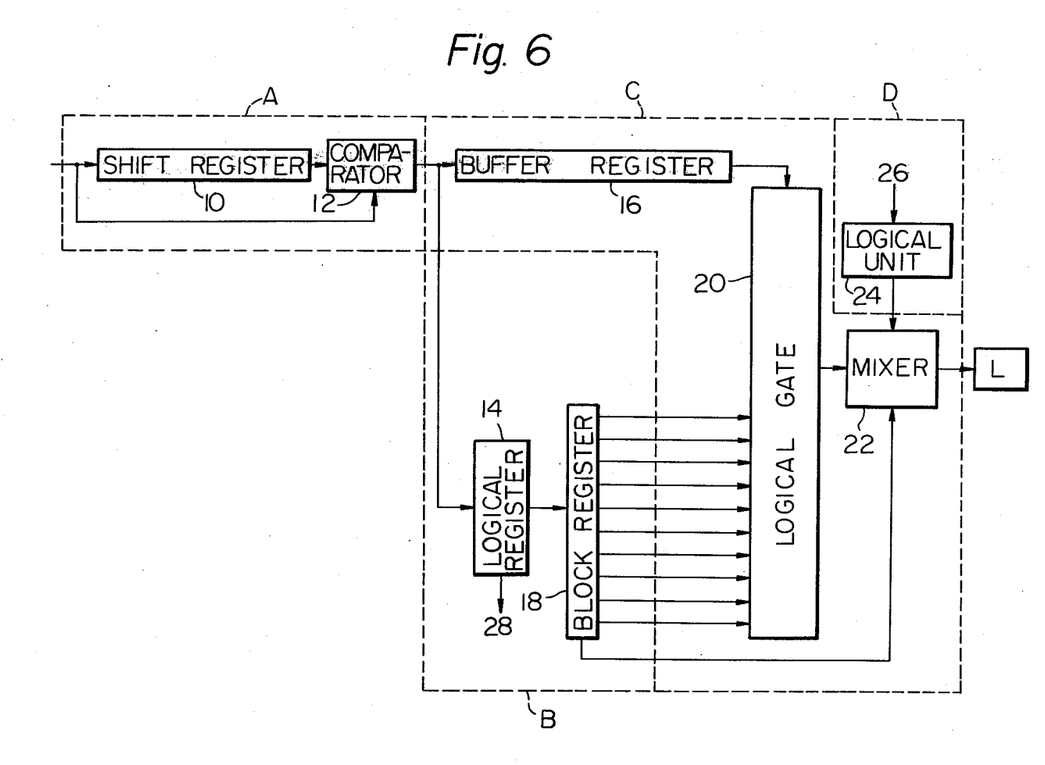
FIG. 6 is a block diagram of a compression system according to the invention.

FIG. 6 shows a system for compressing graphical information according to the method described above, in which only blocks containing positive pulses are retained. The input information is assumed to be encoded in the form of an electrical pulse train divided into a predetermined number of blocks of equal length, and also divided into a predetermined number of lines each containing an equal number of blocks. The input information will also be assumed as in the form of FIG. 2.

An optional delta graphic converter A comprises a shift register 10 and a comparator 12. The converter A is not required if the information is already supplied in delta graphic form, or if it is to be compressed from the format of FIG. 2 directly. The input information is supplied into the input of the shift register 10 and simultaneously into one input of the comparator 12. The output of the shift register 10 is connected to another input of the comparator 12. The output of the comparator 12 is connected to an input of a logical register 14 of a first means B, and also to an input of a buffer register 16 of a second means C. An output of the logical register 14 is connected to the input of a block register 18 having a bit capacity equal to the number of blocks per line (here described as 10), with each bit corresponding to a specified block position in the line. Outputs of both the block register 18 and the buffer register 16 are connected to inputs of a logical gate 20, the output of which is connected to an input of a mixer 22. Third means D comprise a logical unit 24 having an input 26 and an output connected to another input of the mixer 22. The input 26 of the logical unit 24 is connected to the output 28 of the logical register 14. A third input of the mixer 22 is connected to another output of the block register 18.

In operation, the first line is serially fed into the shift register 10 and the comparator 12, the shift register 10, logical register 14 and buffer register 16 having the capacity to store an entire line. Prior to data entry, the register 10, 14 and 16 are reset so that all of their stages are logically low. The first line is, therefore, serially fed without alteration into the buffer register 16 and the logical register 14 through the comparator 12. As the second line is fed in, it is compared bit by bit with the first line, and a logically positive "1" or delta black signal is fed to the buffer register 16 and the logical register 14 if the bits compared are different. A logically negative "0" or delta white signal is fed to the buffer register 16 and the logical register 14 if the compound bits are the same. During the comparison process, the contents of the shift registers 10, 14 and 16, which previously contained the first line, are sequentially replaced bit by bit with the second line. When the operation is completed, the shift register 10 contains the second line in its original form and is ready for introduction of the third line. During the process, the second line is converted into delta graphic form by the comparator 12 and fed into the buffer register 16 and the logical register 14. The logical register 14 and buffer register 16 thus contain the entire 100 bits of delta graphic information converted by the converter A. This process is repeated for each line.

The logical register 14 is arranged in any known manner to examine the output of the converter A bit by bit and determine which blocks contain delta black information. A logically positive "1" siganl is stored in each bit of the block register 18 corresponding to a block containing delta black information, and a logically negative "0" signal is stored in the bits of the block register 18 corresponding to blocks which are devoid of delta black information. Thus, the block signal illustrated in FIG. 5 is synthesized. The logical gate 20 has access to the contents of the buffer register 16, receives the block signal as a control input from the block register 18, and is arranged in any known manner to gate therethrough the blocks stored in the buffer register 16 containing delta black information under the control of the block signal from the block register 18. Both the block signal and the blocks containing delta black information are fed into the mixer 22.

The logical unit 24 is connected to the logical register 14 and is arranged in any known manner to sense whether the line being processed contains delta black information, and feed a logically positive "1" signal into the mixer 22 if it does and a logically negative signal "0" if it doesn't. This signal is the line signal.

The mixer 22 is operative to combine the line signal, the block signal and the blocks containing delta black information in the second predetermined arrangement as follows: line signal + block signal (if the line signal is positive) + blocks containing delta black information (if the line signal is positive).

The output of the mixer 22 is fed to a communication link L, which may be arranged to transmit the compressed information to a receiving unit essentially unaltered over a transmission wire, use it to modulate a radio carrier wave for radio transmission, or use it to modulate a light beam for transmission by laser or fiber optics. The communication link L is arranged to provide connection between a transmission unit and a receiving unit, and the invention is not concerned with its details.

Figure 7:
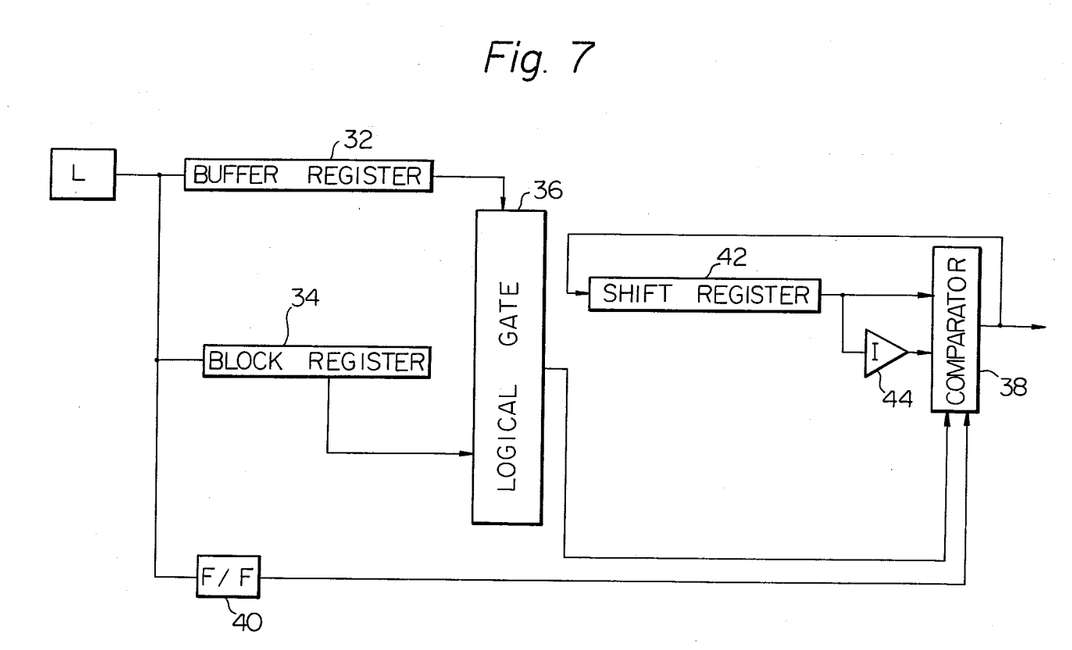
FIG. 7 is a block diagram of an expansion system to expand graphic information compressed by the system of FIG. 6.

FIG. 7 shows an expansion unit to expand the compressed delta graphic information from the compression unit of FIG. 6 to synthesize the original graphic information. The units of FIGS. 6 and 7 in combination with the communication link L constitute a system for transmitting and receiving graphic information encoded in the form of an electrical pulse train. A reproduction device to convert the expanded output of the unit of FIG. 7 into visual form is not a part of the invention.

First storage means comprise a buffer register 32 and second storage means comprise a block register 34 which are similar to the buffer register 16 and the block register 18 respectively of FIG. 6. The buffer register 32, block register 34 and a flip-flop 40 have inputs connected to the output of the communication link L, and store therein the blocks containing delta black information, the block signal and the line signal respectively. A logical gate 36 similar to the logical gate 20 of FIG. 6 has inputs connected to the outputs of the buffer register 32 and the block register 34, and an output connected to an input of a comparator 38. The comparator 38 also has an input connected to the output of the flip-flop 40, and provides as its output the expanded graphic information which has been synthesized or inverted to its original form. A delta graphic inverter comprises a shift register 42 having its input connected to the output of the comparator 38 and its output connected to another input of the comparator 38. An inverter 44 has its input connected to the output of the shift register 42, and its output connected to still another input of the comparator 38.

The operation of the receiving unit of FIG. 7 is essentially opposite to that of the transmission unit of FIG. 6. As mentioned above, the line signal, the block signal and the blocks containing delta black information are stored in the flip-flop 40, the block register 34 and the buffer register 32 respectively.

If the line signal in the flip-flop 40 is logically negative "0" indicating that the line being processed is devoid of delta black information, the comparator 38 will gate therethrough a line stored in the shift register 42 unaltered. If the line signal is logically positive "1" indicating that the line contains delta black information, the following operation takes place.

During processing of a preceding line, the delta graphic representation of the line has been expanded by the comparator 38 to its original form and fed out. Also, the expanded form of the preceding line was stored in the shift register 42 as will be understood from the description below. The logical gate 36 is arranged in any known manner to sequentially gate the blocks therethrough under the control of the block signal in the block register 34. If a bit of the block signal corresponding to a given block is logically positive, the logical gate 36 will gate the corresponding block therethrough to the comparator 38. If the bit is logically negative, the logical gate 36 will generate a block devoid of pulses. In this manner, the compressed delta graphic information is expanded to standard delta graphic form.

For the reasons explained above, the delta graphic inverter is optional, and when provided, it operates as follows.

Simultaneously, the preceding line in expanded and inverted form from the shift register 42 and the output of the logical gate 36 are fed into the comparator 38 and compared on a bit by bit basis. If the delta graphic input bit of the line being processed from the logical gate 36 is logically negative, indicating that the corresponding bits of the two lines are the same, the comparator 38 will select its direct input from the shift register 42 and pass the bit from the shift register 42 to the output of the comparator 38 without alteration. If, however, the bit from the logical gate 36 is logically positive indicating that the bits of the two lines are different, the comparator 38 will select its input from the inverter 44 so that the bit from the shift register 42 appears at the output of the comparator 38 in logically inverted form. As each bit of a line is being inverted from delta graphic to its original form, the inverted form is stored in the shift register 42 to replace the corresponding bit of the preceding line, and after a line has been processed and output, a copy of the final form will be stored in the shift register 42 for comparison with the next line.

Figure 10:
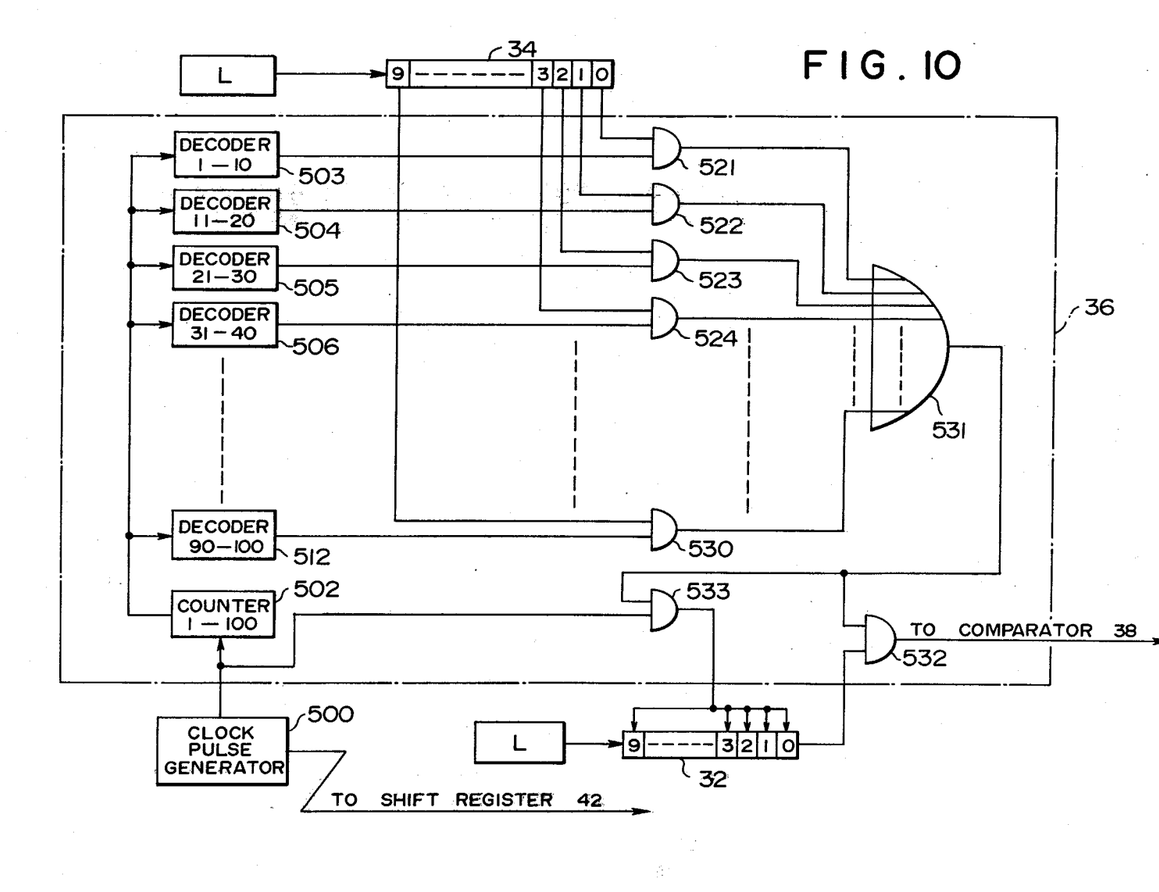
FIG. 10 shows part of the expansion system of FIG. 7 in greater detail.

An exemplary form of the logical gate 36, buffer register 32 and block register 34 is shown in FIG. 10. The buffer register 32 is a shift register having 100 stages numbered 0 to 99. The block register 34 is a shift register having 10 stages numbered 0 to 9. A clock pulse generator 500 is provided which is essentially similar to the clock pulse generator 63 of the compression system. The logical gate 36 is essentially similar to the logical gate 20 of the compression system and comprises a counter 502 which receives the clock pulses from the generator 500. The clock pulses are also fed to the shift input of the shift register 42. The counter 502 is arranged to count from 1 to 100 and reset in response to the clock pulses. The logical gate 36 further comprises 10 decoders 503 to 512 (the decoders 507 to 511 are not shown) arranged to produce high outputs when the count in the counter 502 is between 1-10, 11-20, 21-30 ... 90-100 respectively. The outputs of the decoders 503 to 512 are connected to inputs of AND gates 521 to 530 respectively (the AND gates 525 to 529 are not shown). The outputs of stages 0 to 9 of the block register 34 are connected to other inputs of the AND gates 521 to 530 respectively. The outputs of the AND gates 521 to 530 are connected to inputs of an OR gate 531, the output of which is connected to an input of an AND gate 532. The output of the OR gate 531 is also connected to an input of an AND gate 533, the output of which is connected to the shift input of the buffer register 32. The clock pulses from the generator 500 are also fed to another input of the AND gate 533. The serial output of the buffer register 32 is connected to another input of the AND gate 532. The output of the AND gate 532 is connected to the comparator 38 as shown in FIG. 7.

In operation, the line signal is stored in the flip-flop 40, the block signal in the block register 34 and the data for the line in the buffer register 32 in the manner described above. The clock pulses are applied to the shift register 42 directly, and to the buffer register 32 through the AND gate 533. When the count in the counter 502 is between 1 and 10, the decoder 503 produces a high output to enable the AND gate 521. If the first block contains black information, the 0th stage of the block register 34 will be logically high so that the output thereof applied to the AND gate 521 will cause the AND gate 521 to produce a high output. This is applied to the AND gates 532 and 533 to enable the same. The clock pulses are thereby gated to the shift input of the buffer register 32 through the AND gate 533 and the output of the buffer register 32 is gated to the comparator 38 through the AND gate 532. The clock pulses cause the buffer register 32 and the shift register 42 to shift in synchronism so that the first 10 clock pulses cause the first block of data to be transferred to the comparator 38 and compared with the data in the shift register 42 as described above.

If there is no information in the first block, the 0th stage of the block register 34 will be low, and the AND gate 521 will be inhibited so as to produce a low output. This inhibits the AND gates 532 and 533 through the OR gate 531. The first 10 clock pulses thereby cause the shift register 42 to shift, but the shift register 32 is prevented from shifting by the low output of the AND gate 533. The output of the AND gate 532 is low, so that a low signal is applied to the comparator 38 throughout the duration of the first 10 clock pulses. The data being fed to the comparator 38 from the shift register 42 is compared with a logically low signal so that the first block in the shift register 42 is gated to the comparator 38 unaltered. This has the effect of generating a block of delta white information in the manner desired.

In response to the counts of 11-20, 21-30, ... 90-100, the decoders 504, 505 ... 512 respectively produce high outputs to enable the AND gates 522, 523, ... 530 respectively. The remaining blocks are processed in a manner identical to that of the first block.

The registers 14, 16 and 18, the logical gate 20 and the mixer 22 may be embodied by a number of different but well known circuits which operate in completely different manners to produce the same results. Data transfer from the buffer register 16 through the logical gate 20 to the mixer 22 may be performed either serially or in parallel with the only difference being in the transfer speed. A system by which such transfer is accomplished serially is the simplest and the least expensive to construct, although data transfer is slower than with a parallel system, and is illustrated in FIGS. 8 and 9.

Figure 8:
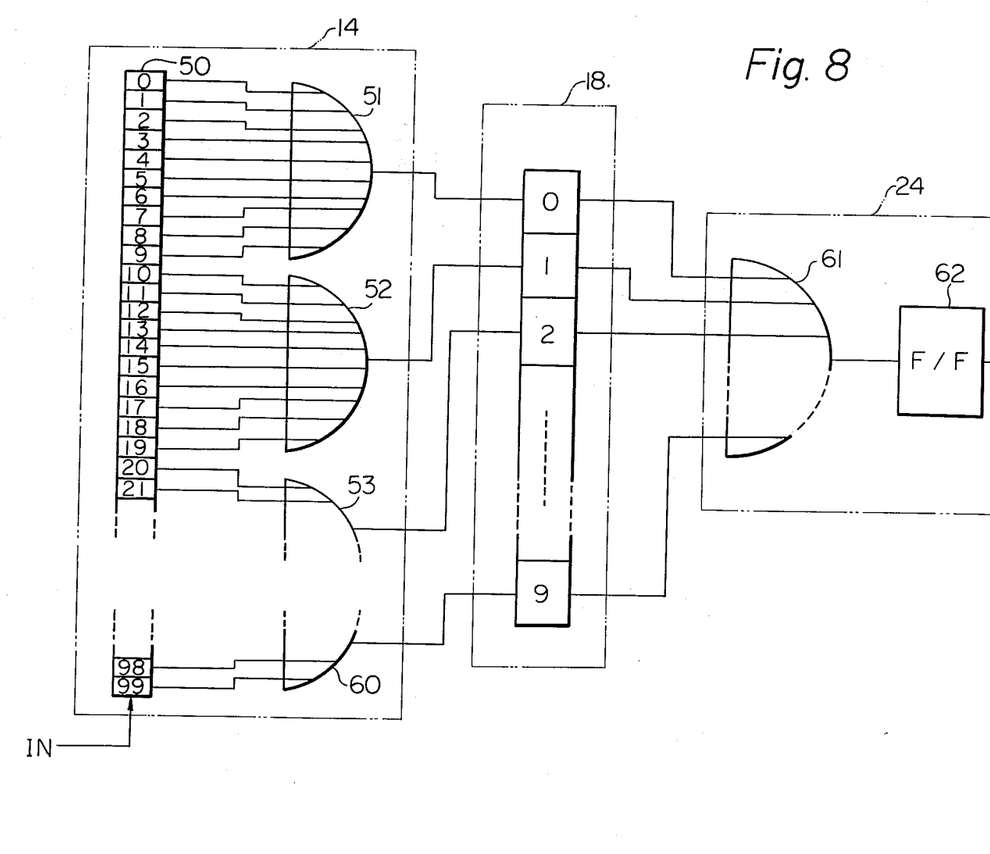
FIG. 8 is a partial electrical schematic diagram of the compression of FIG. 6.
Figure 9:
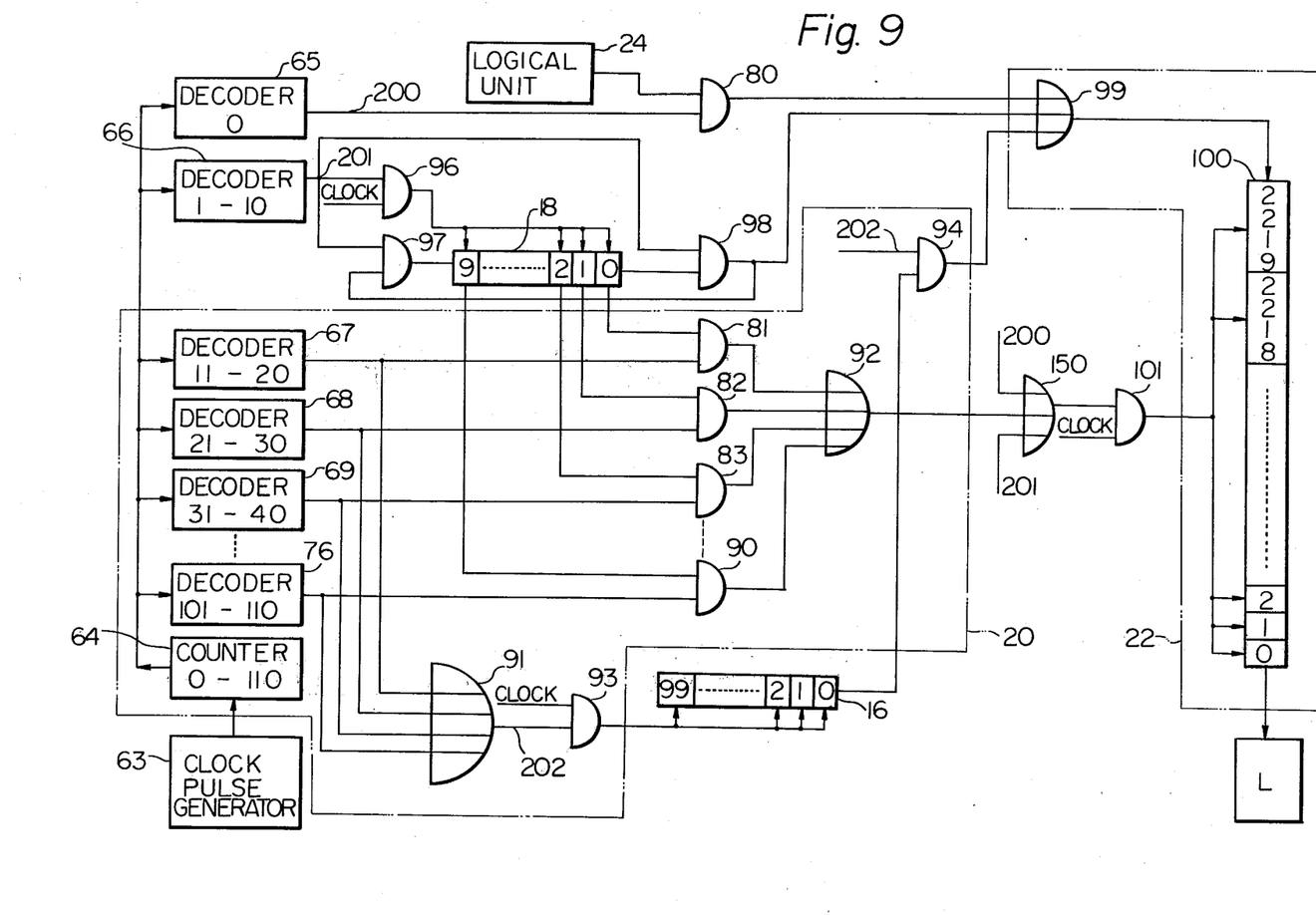
FIG. 9 shows other parts of the compression system of FIG. 6.

In FIG. 8, the logical register 14 is shown as comprising a 100 bit shift register 50 and ten OR gates 51 to 60. Only the OR gates 51, 52, 53 and 60 are shown for simplicity of illustration.

The outputs of the first ten stages (numbered 0 to 9) of the shift register 50 are connected to inputs of the OR gate 51. The outputs of the second ten stages (numbered 10 to 19) to the tenth ten stages (numbered 90 to 99) are connected to inputs of the OR gates 52 to 60 respectively. The 0th to 9th blocks of a given line are stored in the stages (0 to 9) to (90 to 99) of the shift register 50 respectively. The OR gates 51 to 60 will produce logically high outputs if at least one of their respective inputs is logically high indicating that the respective block contains at least one bit of delta black information, and logically low inputs if all of the respective inputs are logically low indicating that the respective block is devoid of delta black information.

The block register 18 is simply a shift register having 10 stages, or one for each of the blocks in a line. The outputs of the OR gates 51 to 60 are connected to the inputs of the stages (0 to 9) for the bits of the block signal representing the blocks 0 to 9 respectively. The outputs of all of the stages of the block register are fed to respective inputs of an OR gate 61 in the logical unit 24. The output of the OR gate 61 is connected to the input of a flip-flop 62. The OR gate 61 will produce a logically high or a logically low output to set or reset the flip-flop 62 to produce a logically high or logically low output if at least one of the stages of the block register 18 is logically high or if none of the stages of the block register 18 are logically high respectively. The logically high or low output of the flip-flop 62 represents the line signal for a line containing delta black information or no delta black information respectively.

Referring now to FIG. 9, a clock pulse generator 63 is provided which has its output connected to the input of a counter 64. The counter 64 is arranged to count from 0 to 110 in response to the clock pulses from the clock pulse generator 63. The output of the counter 64 is connected to inputs of 12 decoders 65 to 76 (the decoders 70 to 75 are not shown for simplicity of illustration). The decoders 67 to 76 constitute part of the logical gate 20. The decoder 65 is arranged to produce a logically high output when the count in the counter 64 is zero. The decoders 66 to 76 produce logically high outputs when the count in the counter 64 is 1 to 10, 11 to 20, 21 to 30, 31 to 40, . . . . , 101 to 110 respectively. The decoder 66, for example, may comprise a first AND gate to detect the count of 1 in the counter 64 and set a flip-flop in response thereto and a second AND gate to detect the count of 11 and reset the flip-flop in response thereto although these elements are not shown.

The output of the decoder 65 is connected through a line 200 to an input of an OR gate 150. The outputs of the decoder 65 and the logical unit 24 are connected to inputs of an AND gate 80. The outputs of the decoders 67 to 76 are connected to inputs of ten AND gates 81 to 90 respectively (only the AND gates 81, 82, 83 and 90 are shown which are connected to the decoders 67, 68, 69 and 76 respectively for simplicity of illustration). The outputs of stages 0 to 9 of the block register 18 are connected to inputs of the AND gates 81 to 90 respectively. The outputs of all of the decoders 67 to 76 are connected to inputs of an OR gate 91 and the outputs of all of the AND gates 81 to 90 are connected to inputs of an OR gate 92. The output of the OR gate 91 is connected to inputs of AND gates 93 and 94, the latter through a line 202. The clock pulses from the clock pulse generator 63 are applied to another input of the AND gate 93, the output of which is connected to the shift input of the buffer register 16. The serial output of the buffer register 16 is connected to another input of the AND gate 94, the output of which is connected to an input of an OR gate 99.

The output of the decoder 66 is connected to inputs of AND gates 96, 97 and 98 and the OR gate 150, the latter through a line 201. The clock pulses from the clock pulse generator 63 are applied to another input of the AND gate 96, the output of which is connected to the shift input of the block register 18. The serial output of the block register 18 is connected to an input of the AND gate 98, the output of which is connected to inputs of the OR gate 99 and the AND gate 97. The output of the AND gate 97 is connected to the serial input of the block register 18. The output of AND gate 80 is connected to an input of the OR gate 99, the output of which is connected to the serial input of a shift register 100 of the mixer 22. The output of the OR gate 92 is connected to an input of the OR gate 150, the output of which is connected to an input of an AND gate 101. The clock pulses from the clock pulse generator 63 are applied to another input of the AND gate 101, the output of which is connected to the shift input of the shift register 100.

The shift register 100 has a capacity of 2220 bits (numbers 0 to 2219) store all 20 lines of the graphic information. Each line recquires one bit for the line signal, 10 bits for the block signal and 100 bits for the data. The serial output of the shift register 100 is connected to the communication link L.

In operation, the compressed graphic information is stored in the buffer register 16 and the line and block signals are produced and stored in the logical unit 24 and the block register 18 as described above. The counter 64 is reset prior to the operation. The count in the counter 64 is initially zero and pulses from the clock pulse generator 63 increment the counter 64. With the count in the counter 64 zero, only the decoder 65 produces a logically high output to enable the AND gate 80. The high output of the decoder 65 is also applied through the OR gate 150 to the AND gate 101 to enable the AND gate 101. The output of the logical unit 24 (the line signal) is applied through the AND gate 80 and OR gate 99 to the serial input of the shift register 100. As the next clock pulse is applied to the AND gate 101, the register 100 is shifted and the line signal is entered into stage 2219 thereof.

If the line signal is logically low indicating that the line is devoid of delta block information, supervisory means which are not the subject matter of the invention and are not shown will reset the counter 64 to zero and control the unit to process the next line. The next clock pulse also increments the counter 64 so that only the decoder 66 produces a high output which enables the AND gates 96, 97, 98 and 101, the latter through the OR gate 150. The serial output of the block register 18 is connected to the serial input of the shift register 100 through the AND gate 98 and the OR gate 99. The serial output of the block register 18 is also connected to the serial input thereof through the AND gate 97. Ten clock pulses applied to the shift input of the block register 18 through the AND gate 96 cause the block signal to circulate through the block register 18 to its initial position. The bits of the block signal appear sequentially at the serial output of the block register 18 and are applied to the serial input of the shift register 100. The same ten clock pulses applied to the shift input of the shift register 100 through the OR gate 150 and AND gate 101 cause the shift register 100 to shift in synchronism with the block register 18 so that the block signal is stored in the shift register 100 after the line signal.

The 11th clock pulse produces a logically high output from only the decoder 67 to enable the AND gates 81, 93 and 94, the latter two through the OR gate 91. The output of the buffer register 16 is connected to the input of the shift register 100 through the AND gate 94 and OR gate 99. If the output of the first stage (numbered 0) of the block register 18 is logically high, the AND gate 81 will produce a high output which is applied to the AND gate 101 through the OR gate 92 and the OR gate 150 to enable the AND gate 101. The next ten clock pulses applied to the buffer register 16 through the AND gate 93 and to the shift regester 100 through the AND gate 101 will cause the registers 16 and 100 to shift in synchronism so that the first ten bits of graphic information (the first block) is entered into the shift register 100 after the line and block signals. If the output of the first stage of the block register 16 is logically low, the AND gate 81 will produce a low output to inhibit the AND gate 101. The ten clock pulses in this case shift the buffer register 16 ten times so that the first bit of the second block of data will appear in the first stage (numbered 0) of the buffer register 16. These clock pulses will not affect the shift register 100 since the AND gate 101 is inhibited and the clock pulses are not gated therethrough to the shift input of the shift register 100. In this manner, if the first block does not contain delta black information it will not be entered into the shift register 100.

The 21st clock pulse will produce a high output from the decoder 68 only to enable the AND gate 82. The second block will be entered into the shift register 100 only if the output of the second stage of the block register 18 is high in a manner identical to that described above with references to the first block. The operation is further identical with respect to the 3rd to 10th blocks in which the decoders 68 to 76 produce high outputs to enable the AND gates 83 to 90 respectively.

The supervisory means may, after all of the lines have been processed in the manner described above, shift the shift register 100 until the line signal of the first line appears in the first stage (numbered 0) of the shift register 100. The entire 20 lines in compressed form are then transmitted over the communication link L.

What is claimed is:

1. A method of compressing graphic information for transmission which is encoded in the form of an electrical pulse train in which an original graphic document is scanned in a regular orthogonal pattern having a predetermined number of blocks of equal length and a predetermined number of lines of equal length to produce the electrical pulse train, the number of blocks per line thus being equal to the predetermined number of blocks divided by the predetermined number of lines, comprising the steps of:

a. determining which of the blocks contain pulses and producing electrical block signals indicative thereof;
b. combining in a predetermined arrangement the block signals and only those blocks containing pulses for transmission;
c. determining which of the lines include blocks which contain pulses and producing electrical line signals indicative thereof; and
d. combining the line signals with the block signals and only those blocks containing pulses in a second predetermined arrangement for transmission, the second predetermined arrangement being such that for each line, a line signal is followed by a block signal followed by only those blocks of the line containing pulses when the line contains at least one pulse, and only the line signal is provided when the line is devoid of pulses.

2. A method according to claim 1, in which the graphic information is encoded so that a pulse of the pulse train represents a corresponding area in the original graphical document whose density is greater than a predetermined value.

3. A method according to claim 1, in which the graphic information is encoded in delta graphic form.

4. A method according to claim 1, in which the graphic information is encoded in a modified delta graphic form in which pulses having pulse lengths shorter than a predetermined value are suppressed.

5. A system for compressing graphic information for transmission which is encoded in the form of an electrical pulse train in which an original graphic document is scanned in a regular orthogonal pattern having a predetermined number of blocks of equal length and a predetermined number of lines of equal length to produce the electrical pulse train, the number of blocks per line thus being equal to the predetermined number of blocks divided by the predetermined number of lines, comprising:

first means into which the pulse train is fed and which is operative to determine which of the blocks contain pulses and produce electrical block signals indicative thereof;

second means into which the pulse train is also fed, which is responsive to the output of the first means, and is operative to combine in a predetermined arrangement the block signals and only those blocks containing pulses for transmission; and third means communicating with at least one of the first and second means and being operative to determine which of the lines include blocks which contain pulses and produce electrical line signals indicative thereof, the second means being further operative to combine the line signals with the block signals and only those blocks containing pulses in a second predetermined arrangement for transmission, the second predetermined arrangement being such that for each line, a line signal is followed by a block signal followed by only those blocks of the line containing pulses when the line contains at least one pulse, and only the line signal is provided when the line is devoid of pulses.

6. A system according to claim 5, in which the block signals and the line signals each have a logically positive value when the corresponding block and line respectively contains a pulse, and a logically negative value when the corresponding block and line respectively is devoid of pulses, and in which;

the first means comprises a logical register and a block register, the block register having the same number of bits as the number of blocks per line, each bit corresponding to a specified block position in a line; whereby the logical register is operative to process the pulse train one line at a time, determine whether each block contains a pulse, and store logically positive signals in bits of the block register corresponding to blocks containing a pulse and logically negative signals in bits of the block register corresponding to blocks devoid of pulses, the thus synthesized contents of the block register constituting the block signal;

said second means comprises a buffer register having a capacity to store the information of one line and which processes the pulse train one line at a time simultaneously with the first means, the second means also comprising a logical gate receiving the block signal as a control input from the block register and having access to the contents of the buffer register;

the logical gate being operative to sequentially gate the contents of the buffer register in accordance with the block signal to produce an output signal including only those blocks for which the corresponding bit of the block register contains a logically positive signal indicating that the block contains a pulse;

the second means further comprising a mixer responsive to the output signal from the logical gate and having access to the block signal in the block register;

the third means comprising a logical unit having access to the block signal in the blodk register and being operative to produce a logically positive line signal when a logically positive signal is stored in one of the bits of the block register and a logically negative line signal when all of the bits of the block register contain a logically negative signal;

the mixer being further responsive to the line signal from the logical unit and operative to combine the line signal, the block signal, and only those blocks containing pulses in the second predetermined pattern for transmission.

7. A system according to claim 6, in which the graphic information is encoded in delta graphic form.

8. A system according to claim 6, in which the graphic information is encoded so that a pulse of the pulse train represents a corresponding area in the original graphical document whose density is greater than a predetermined value.

9. A system according to claim 8, further comprising a delta graphic converter to convert the graphical information into delta graphic form.

10. A system according to claim 9, in which the delta traphic converter comprises;

a shift register arranged to store one line of the pulse train; and a comparator having access to the contents of the shift register and arranged to process the line of the pulse train following that stroed in the shift register;

the comparator comparing the line being processed to the preceding line stored in the shift register and producing a pulse corresponding to each portion of the line being processed which is different from the corresponding portion of the previous line, thereby converting the line being processed into delta graphic form;

the comparator feeding its converted output to the buffer register and the logical register.

11. A system for transmission and reception of graphic information which is encoded in the form of an electrical pulse train divided into a predetermined number of blocks of equal length, comprising, in combination, a transmission unit, a communication link and a receiving unit, the transmission unit comprising;

first means into which the pulse train is fed and which is operative to determine which of the blocks contain pulses and produce an electrical block signal indicative thereof; and second means into which the pulse train is also fed, which is responsive to the output of the first means, and is operative to combine in a predetermined arrangement the block signal and only those blocks containing pulses for transmission;

the communications link being arranged to convey the output of the second means to the receiving unit, the receiving unit comprising;

first storage means responsive to the output of the second means and operative to store only the transmitted blocks;

second storage means responsive to the output of the second means and operative to store only the block signal; and gate means having access to the contents of the first and second storage means and being operative to, according to the predetermined arrangement, generate blocks devoid of pulses where indicated by the block signal and gate therethrough blocks containing pulses where indicated by the block signal to thereby synthesize the original electrical pulse train.

* * * * *